United States Patent
Kurtz et al.

(10) Patent No.: US 7,347,098 B2
(45) Date of Patent: Mar. 25, 2008

(54) APPARATUS FOR PROVIDING AN OUTPUT PROPORTIONAL TO PRESSURE DIVIDED BY TEMPERATURE (P/T)

(75) Inventors: Anthony D. Kurtz, Saddle River, NJ (US); Joseph Van DeWeert, Maywood, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 0 days.

(21) Appl. No.: 11/431,167

(22) Filed: May 9, 2006

(65) Prior Publication Data

US 2007/0295094 A1 Dec. 27, 2007

(51) Int. Cl.
*G01L 7/00* (2006.01)
(52) U.S. Cl. ...................................................... 73/714
(58) Field of Classification Search ................... 73/714
See application file for complete search history.

(56) References Cited

U.S. PATENT DOCUMENTS

| | | | |
|---|---|---|---|
| 4,395,915 A * | 8/1983 | Singh | 73/720 |
| 4,766,763 A * | 8/1988 | Kurtz | 73/49.2 |
| 5,428,985 A * | 7/1995 | Kurtz et al. | 73/25.01 |

* cited by examiner

*Primary Examiner*—Edward Lefkowitz
*Assistant Examiner*—Jermaine Jenkins
(74) *Attorney, Agent, or Firm*—Arthur L. Plevy, Esq.; The Plevy Law Firm

(57) ABSTRACT

A circuit produces an output that is proportional to the molar density of gas in a chamber. The circuit employs an operational amplifier which measures the temperature using a RTD or other element that changes resistance with temperature. The RTD is placed such that it produces a decreasing current draw at the inverting input of the operational amplifier as the temperature increases. This decreasing current draw in turn produces a decreasing voltage at the output of the operational amplifier. By changing the ratio of resistors connected to the non-inverting terminal of the operational amplifier one changes the offset of the output voltage. By changing the feedback resistor connected from the output of the operational amplifier to the inverting terminal and connecting the output of the inverting terminal to a voltage divider including the RTD device, one can change the gain with temperature. Thus the output voltage of the operational amplifier is carefully controlled to be proportional to 1/T for many different temperature scales and ranges. The output of the amplifier serves as the biasing voltage for a pressure transducer.

12 Claims, 1 Drawing Sheet

APPARATUS FOR PROVIDING AN OUTPUT PROPORTIONAL TO PRESSURE DIVIDED BY TEMPERATURE (P/T)

FIELD OF THE INVENTION

This invention relates to apparatus for providing an output proportional to pressure divided by temperature and more particularly to provide an output proportional to the molar density of a gas in a container.

BACKGROUND OF THE INVENTION

It is well known that a gas, at relatively low pressures and temperatures, conforms well to the ideal gas law. This gas law is PV=nRT and is also referred to as the Van der Waal gas equation. In this equation, P is the pressure, V is the volume, n is the number of moles of the gas, R is the Rydberg or universal gas constant and T is the temperature. This formula of course can be rearranged to yield $$n\frac{R}{V} = \frac{P}{T},$$

where the left side of the equation is the molar density of the system. This is useful because one can see that if the volume of a cavity does not change, it is possible to detect a leak in the cavity based on the simple ratio of pressure over temperature. This concept has been used in the past, and there are a number of patents which are assigned to Kulite Semiconductor Products, Inc., the assignee herein which relate to such apparatus. See for example, U.S. Pat. No. 4,766,763 issued on Aug. 30, 1988 entitled "Gas Leak Detection Apparatus and Methods" by A. D. Kurtz the inventor herein. That patent discloses a gas leak detector employing pressure transducers. In one embodiment the pressure in a vessel is monitored by means of a pressure transducer. The output of the pressure transducer is coupled to an operational amplifier, where the amplifier has a gain which is proportional to $$\frac{1}{T}$$

absolute. Thus, since the gain is inversely proportional to temperature, the amplifier produces an output which is independent of temperature but which is capable of providing a pressure indication when there is a gas leak in the container. See also U.S. Pat. No. 5,428,985 issued on Jul. 4, 1995 to A. D. Kurtz et al., and assigned to the assignee herein. That patent is also entitled "Gas Leak Detection Apparatus and Methods" and shows an improved gas leak detection apparatus for detecting a leak in a vessel. The apparatus uses a pressure transducer, an amplifier and feedback which operates to effectively and accurately model the VanderWaal equation of gases. The apparatus is adaptable for operation with any number of different gases by simply changing the values of specific circuit elements. In that patent there is also disclosed the above noted formulas as well as modifications of the same. See also U.S. Pat. No. 6,935,184 issued Aug. 30, 2005, to A. D. Kurtz and entitled "Pressure Transducer Capable of Detecting Internal Leakage of External Media". That patent describes a pressure transducer which has a first header containing a first pressure sensor for measuring pressure of the media. A second header contains a second pressure sensor and is disposed at the second end of a spacer. The spacer and the header assembly is formed with a sealed leak detection cavity for capturing the media that leaks past the first header.

Thus, it is apparent that using pressure transducers to detect leaks in various containers and vessels is well known as indicated by the above noted materials. The present invention is a circuit which produces an output which is proportional to pressure over temperature for use in leak detection and situations with relatively low pressures and temperature such as those pressures found in an automobile tire or other chamber.

SUMMARY OF THE INVENTION

Apparatus for providing an output proportional to pressure (P) divided by temperature (T)

$$\left(\frac{P}{T}\right)$$

comprising: an operational amplifier having an inverting input terminal (−), a non-inverting input terminal (+) and an output terminal, a pressure transducer having a bridge array including at least one piezoresistive element and having a voltage biasing terminal coupled to one arm of the bridge with the other arm adapted to be connected to a point of reference potential, with the output of the bridge taken between the center terminal of each bridge arm, means for connecting the output terminal of the operational amplifier to the voltage biasing terminal, a first voltage divider including a resistor element which varies resistance according to temperature (RTD) in series with a first fixed resistor (R3), with one terminal of the fixed resistor adapted to be connected to a source of voltage ($V_{in}$) with the other terminal of the first resistor connected to one terminal of the resistor element to form a common junction with the other terminal of the resistor element connected to a point of reference potential, with the common junction connected to the inverting input terminal of the operational amplifier, a second voltage divider having a second (R1) and third resistor (R2) in series between a first terminal adapted to be connected to the source of voltage ($V_{in}$) and a second terminal adapted to be connected to a point of reference potential, with the common junction between the second and third resistors connected to the non-inverting terminal of the operational amplifier, a feedback resistor (R4) connected between the output terminal of the operational amplifier and the inverting terminal whereby the gain of the amplifier changes with temperature, and where the second and third resistors change the offset of the output voltage of the amplifier to cause the amplifier to provide an output voltage at the output terminal directly proportional to $$\frac{1}{T}$$

and therefore to cause the pressure transducer to provide an output proportional to $$\frac{P}{T}.$$

DETAILED DESCRIPTION OF THE INVENTION

Figure 1:
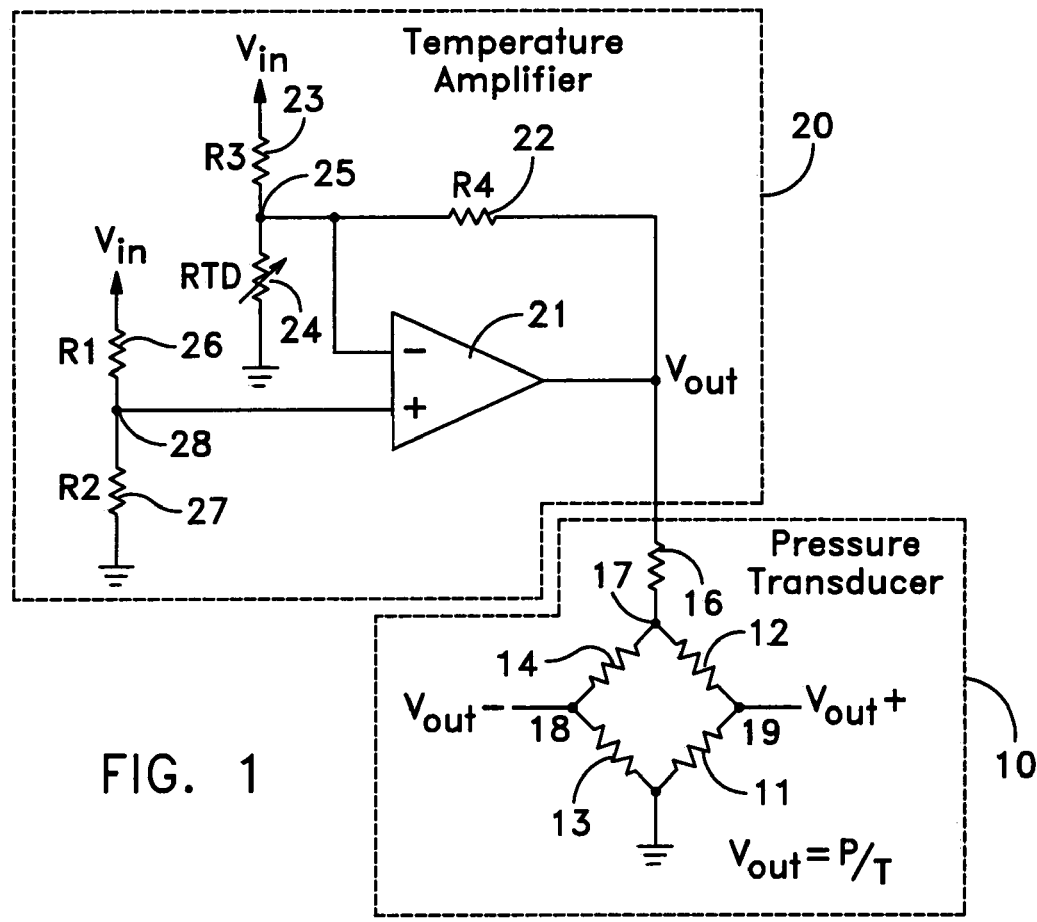
FIG. 1 is a schematic view of a circuit for providing an output proportional to pressure divided by temperature according to this invention.

Referring to FIG. 1, there is shown in a dashed line the two stages of this invention. Reference numeral 10 refers to a pressure transducer, which essentially is a device containing pressure sensors normally on a deflectable diaphragm. The pressure sensors, as for example 11, 12, 13 and 14 may be piezoresistive devices which are deposited or otherwise formed on a semiconductor or other diaphragm and operate to change resistance according to a pressure applied to the diaphragm. There are many patents which are assigned to the assignee herein which describe such devices and any particular pressure transducer can employed for the pressure transducer 10. For examples of such transducers reference is made to U.S. Pat. No. 6,363,792 entitled "Ultra-High Temperature Transducer Structure" issued on Apr. 2, 2002 to A. D. Kurtz et al. and assigned to the assignee herein. See also U.S. Pat. No. 6,530,282. As indicated there are many patents assigned to the assignee herein which depict pressure transducers which can be employed for the transducer 10.

Also seen connected to the transducer via a resistor 16, is the output of a temperature amplifier circuit depicted by reference numeral 20. The temperature amplifier circuit includes an operational amplifier 21 whose output is connected to one terminal of resistor 16. The other terminal of resistor 16 is connected to the biasing terminal 17 of the Wheatstone bridge configuration including resistors 11 to 14. As seen the output from the bridge is taken between terminals 18 and 19 designated as $V_{out-}$ and $V_{out+}$. The output of operational amplifier 21 is connected to the bridge via resistor 16 and also is connected to a feedback resistor 22 (R4). The feedback resistor 22 goes from the output to the negative terminal of the operational amplifier 21. This is a conventional feedback resistor which essentially determines the gain of the operational amplifier. The negative or inverting terminal is further coupled to a voltage divider consisting of resistors 23 (R3) and resistor 24. Resistor 24 is a resistance whose value changes with temperature and is designated as an RTD or resistance thermal detector. There are many devices as 24 which provide a resistance change with temperature. These can include thermistors as well as other devices. In any event, resistors 23 and 24 form a voltage divider whose common terminal 25 is connected to the negative terminal of operational amplifier 21. The voltage divider consisting of resistors 23 and 24 is coupled to a voltage input source designated as $V_{in}$ while the other terminal of resistor 24 is connected to a point of reference potential or ground. Coupled to the positive or non-inverting terminal of operational amplifier 21 is another voltage divider consisting of resistors 26 and 27 (R1 and R2). The resistors 26 and 27 are also coupled between a point of reference potential and the input voltage $V_{in}$. Thus the voltage divider consisting of resistors R1 and R2 has the central terminal 28 connected to the positive input of operational amplifier 21. One terminal of resistor 26 (R1) is coupled to the biasing input voltage source $V_{in}$ and the other terminal of resistor 27 (R2) is coupled to a point of reference potential such as ground. Thus as one can see, the input to the negative input of operational amplifier 21 is derived from the voltage divider which includes the RTD resistor 24. An RTD is preferred based on its linearity. However, if extremely linearity is not required, a different type of resistive element such as a thermistor could be employed.

The RTD 24 is placed such that it produces a decreasing current draw on the inverting input of the operational amplifier 21. This current decreases as the temperature goes up. By changing the ratio of resistors 26 and 27 it is possible to change the offset of the output voltage of the operational amplifier 21. In a similar manner, by changing the ratio of resistors 22 and 23, it is possible to change the gain with the temperature. Thus the output voltage of the operational amplifier 21 can be controlled to be proportional to $$\frac{1}{T}$$

for many different temperature scales and ranges.

The equation for the output of the temperature amplifier is given by the following:

$$V_{out} = R_4 \left( \frac{V_1}{RTD} + \frac{V_1 - V_{in}}{R_3} \right) \quad (1)$$

where $$V_1 = V_{in} \left( \frac{R_1}{R_1 + R_2} \right).$$

As indicated, the pressure transducer employed in the present invention is a well known piezoresistive Wheatstone bridge. Such devices are shown in the above noted patents. Also see U.S. Pat. No. 6,530,282 where that patent shows a device that takes an input voltage and through changes in values of its resistor legs produces an output voltage proportional to the applied pressure. It is inherently a ratiometric device. That means that the output voltage depends on the input voltage. So as the input voltage decreases with increasing temperature, so will the output voltage. Such a device can also be compensated for temperature effects due to the transducer as for example shown in many prior art patents. See for example U.S. Pat. No. 3,245,252 entitled "Temperature Compensated Semiconductor Strain Gage Unit" by A. D. Kurtz et al. issued on Apr. 12, 1966 and assigned to the assignee herein.

Figure 2:
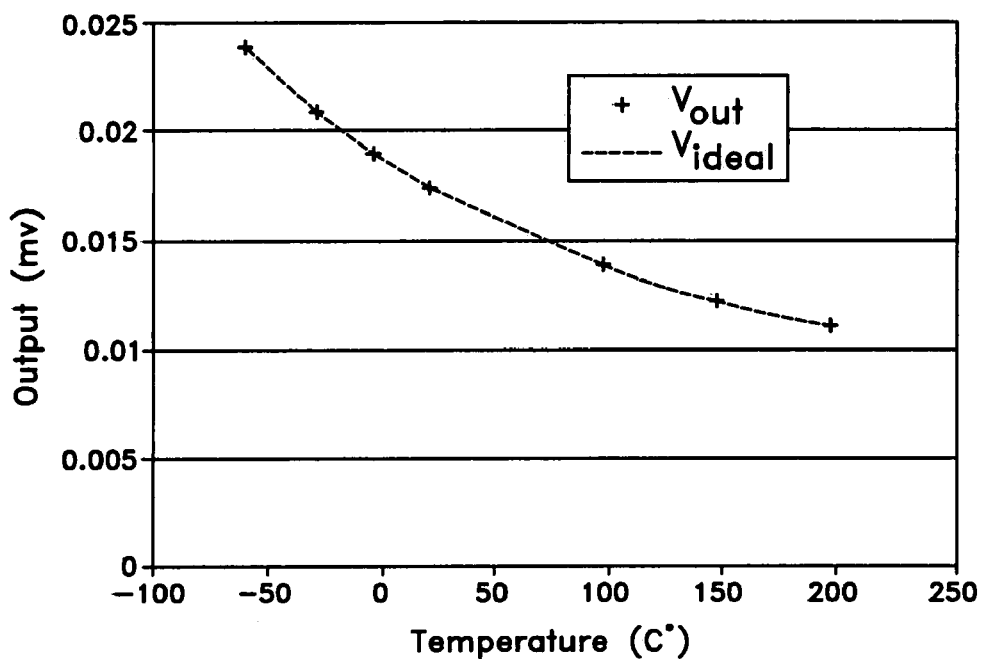
FIG. 2 is a graph depicting the output of the circuit of FIG. 1.

Referring to FIG. 2, there is shown the output of the transducer which is designated by the diamond shaped pattern as compared to the ideal curve of pressure over temperature. The ideal curve is indicated by the dashed line. It is thus apparent that the output from the transducer versus the ideal curve, match up very well. There is a complete unanticipated advantage which is due to the operation of the temperature amplifier 20. The circuit uses only one operational amplifier and no other active electronic devices. Because of this, it is possible to make a very high temperature device. Operational amplifiers are known which can operate up to 400° F. and a pressure transducer can operate at much higher temperatures than this. Thus, the device of FIG. 1 is capable of operating at extremely high temperatures and in harsh environments. Thus such a device can be used in automotive applications, aircraft applications and other applications where high temperatures and harsh environments are present.

Another advantage is due to the fact that the circuit is extremely simple and it consumes very little current and operates at a low voltage such as 1.5 Volts DC. In this manner the device can be employed by using a battery or in a wireless application. The device of FIG. 1 is ideal for measurement of leaks in harsh environments such as a leak in a tire or on an aircraft which undergoes extreme temperature changes during flight. Tires have large temperature variations due to braking conditions and the like. The operational amplifier 21 is available from many sources including such manufacturers as Harris, Texas Instruments, Motorola, and others. As indicated, the pressure transducers employed are manufactured by Kulite Semiconductor and many such transducers can be employed.

It is thus apparent that one skilled in the art upon reading this application will conceive of alternate configurations which are deemed to be encompassed in the spirit and scope of the claims appended hereto. For example, while the preferred embodiment has been described with respect to an operational amplifier circuit configuration, it is understood, in an alternative embodiment, a microprocessor can be programmed to operate in conjunction with an RTD or other such device to supply an output proportional to 1/T, which can be used to bias a pressure transducer.

What is claimed is:

1. Apparatus for providing an output proportional to pressure (P) divided by temperature (T)

$$\left(\frac{P}{T}\right)$$

comprising:
an operational amplifier having an inverting input terminal (−), a non-inverting input terminal (+) and an output terminal,
a pressure transducer having a bridge array including at least one piezoresistive element and having a voltage biasing terminal coupled to one arm of the bridge, with the other arm of the bridge coupled to a point of reference potential, with the output of the bridge taken between the center terminal of each bridge arm,
means for connecting said output terminal of said operational amplifier to said voltage biasing terminal of said bridge,
a first voltage divider including a resistor element which varies resistance according to temperature (RTD) in series with a first fixed resistor (R3) with one terminal of said fixed resistor adapted to be connected to a source of voltage ($V_{in}$) with said other terminal of said first resistor connected to one terminal of said resistor element to form a common junction, with the other terminal of said resistor element connected to a point of reference potential with said common junction connected to said inverting input terminal off said operational amplifier,
a second voltage divider having a second (R1) and third (R2) resistor in series between a first terminal adapted to be connected to said source of voltage ($V_{in}$) and a second terminal adapted to be connected to a point of reference potential, with the common junction between said second and third resistors connected to said non-inverting terminal of said operational amplifier,
a feedback resistor (R4) connected between said output terminal of said operational amplifier and said inverting terminal whereby the gain of said amplifier changes with temperature, and where said second and third resistors change the offset of the output voltage of said amplifier to cause said amplifier to provide an output voltage at said output terminal directly proportional to 1/and therefore to cause said pressure transducer to provide an output proportional to P/T.

2. The apparatus according to claim 1, wherein said means for connecting said output terminal of said operational amplifier to said voltage biasing terminal of said transducer includes at least a fourth (R4) resistor of a selected fixed valve.

3. The apparatus according to claim 1, wherein said bridge array is a Wheatstone bridge having four piezoresistive sensors defining a first series pair connected in parallel with a second series pair with the first common terminal of said connected pairs being said voltage biasing terminal and with the second common terminal of said connected pairs adapted to be connected to said point of reference potential, with the center terminal of said first pair and the center terminal of said second pair providing said output of said pressure transducer.

4. The apparatus according to claim 1, wherein said resistor element is a resistance thermal detector (RTD).

5. The apparatus according to claim 1, wherein said resistor element is a thermistor.

6. The apparatus according to claim 1, wherein the output voltage of said operational amplifier is:

$$V_{out} = R_4\left(\frac{V_1}{RTD} + \frac{V_1 - V_{in}}{R_3}\right) + V_1$$

where $$V_1 = V_{in}\left(\frac{R_1}{R_1 + R_3}\right).$$

7. The apparatus according to claim 1 providing operation at temperatures up to 400° F.

8. The apparatus according to claim 1, wherein said output of said pressure transducer (P/T) is proportional to the molar density of gas in a chamber.

9. The apparatus according to claim 8, wherein said gas is air and said chamber is the chamber of a tire.

10. The apparatus according to claim 8 where:

$$n\frac{R}{V} = \frac{P}{T}$$

where $\frac{P}{T}$ = the output of said pressure transducer n=number of moles of said gas
R=Rydberg or universal gas contant
V=the volume of said chamber.

11. An apparatus for producing an output proportional to pressure (P) divided by temperature (T) comprising:
  a pressure-transducer configured in a bridge array capable of producing an output proportional to an applied pressure (P);
  a circuit coupled to said bridge array for applying an operating potential to said bridge of (1/T), where T is the temperature associated with the circuit, to cause the bridge to provide an output of P/T,
wherein the circuit comprises an operational amplifier having an inverting input terminal (−), a non-inverting input terminal (+) and an output terminal, wherein the pressure transducer includes at least one piezoresistive element, and wherein a voltage biasing terminal is coupled to one arm of the bridge, with the other arm of the bridge coupled to a point of reference potential, with the output of the bridge taken between the center terminal of each bridge arm.

12. The apparatus of claim 11, wherein the circuit comprises a microprocessor.

* * * * *